United States Patent
Rubin et al.

(10) Patent No.: US 7,644,279 B2
(45) Date of Patent: Jan. 5, 2010

(54) CONSUMER PRODUCT DISTRIBUTION IN THE EMBEDDED SYSTEM MARKET

(75) Inventors: Owen Robert Rubin, Oakland, CA (US); Eric Murray, Los Gatos, CA (US); Nalini Praba Uhrig, Purcellville, VA (US)

(73) Assignee: NVIDIA Corporation, San Jose, CA (US)

(*) Notice: Subject to any disclaimer, the term of this patent is extended or adjusted under 35 U.S.C. 154(b) by 1989 days.

(21) Appl. No.: 10/199,923

(22) Filed: Jul. 18, 2002

(65) Prior Publication Data

US 2004/0132479 A1    Jul. 8, 2004

Related U.S. Application Data

(63) Continuation-in-part of application No. 10/010,018, filed on Dec. 5, 2001, now abandoned.

(51) Int. Cl.
*H04L 9/32* (2006.01)
*H04L 29/06* (2006.01)
*G06F 12/14* (2006.01)
*G06F 17/00* (2006.01)
*H04N 7/16* (2006.01)
*H04N 7/167* (2006.01)
*G06F 21/00* (2006.01)

(52) U.S. Cl. ............ 713/176; 713/150; 713/165; 713/168; 713/189; 726/14; 726/26; 380/201; 380/231; 705/51; 705/52; 705/55; 705/59

(58) Field of Classification Search ............ 713/150, 713/165, 168, 176, 189; 726/14, 26; 380/201, 380/231; 705/51, 52, 55, 59

See application file for complete search history.

(56) References Cited

U.S. PATENT DOCUMENTS

| | | | |
|---|---|---|---|
| 5,450,557 | A | 9/1995 | Kopp et al. |
| 5,533,123 | A | 7/1996 | Force et al. |
| 5,572,572 | A | 11/1996 | Kawan et al. |
| 5,646,544 | A | 7/1997 | Iadanza |
| 5,737,631 | A | 4/1998 | Trimberger |
| 5,828,858 | A | 10/1998 | Athanas et al. |
| 5,860,021 | A | 1/1999 | Klingman |
| 5,883,956 | A | 3/1999 | Le et al. |
| 5,889,816 | A | 3/1999 | Agrawal et al. |
| 5,892,900 | A | 4/1999 | Ginter et al. |
| 5,892,961 | A | 4/1999 | Trimberger |
| 5,907,580 | A | 5/1999 | Cummings |

(Continued)

OTHER PUBLICATIONS

Mannion, Patrick. "Acquired Startup Tips Reconfigurable Architecture," EE Times, Aug. 11, 2000, Issue 1126.

(Continued)

*Primary Examiner*—William R Korzuch
*Assistant Examiner*—Aravind K Moorthy
(74) *Attorney, Agent, or Firm*—Patterson & Sheridan, LLP

(57) ABSTRACT

Aspects for consumer product distribution in the embedded system market are described. The aspects include forming a secure network for distributing product digitation files capable of configuring operations of an adaptive computing engine (ACE), and providing an agent server within the secure network for controlling licenses of the product digitation files, wherein a separation of responsibility and control of the distributing and licensing exists.

16 Claims, 7 Drawing Sheets

U.S. PATENT DOCUMENTS

| | | | |
|---|---|---|---|
| 5,910,733 A | 6/1999 | Bertolet et al. | |
| 5,940,438 A | 8/1999 | Poon et al. | |
| 5,943,242 A | 8/1999 | Vorbach et al. | |
| 5,959,881 A | 9/1999 | Trimberger et al. | |
| 5,963,048 A | 10/1999 | Harrison et al. | |
| 5,970,254 A | 10/1999 | Cooke et al. | |
| 5,996,534 A | 12/1999 | Steckel et al. | |
| 6,021,186 A | 2/2000 | Suzuki et al. | |
| 6,021,490 A | 2/2000 | Vorbach et al. | |
| 6,023,742 A | 2/2000 | Ebeling et al. | |
| 6,061,580 A | 5/2000 | Altschul et al. | |
| 6,081,903 A | 6/2000 | Vorbach et al. | |
| 6,088,043 A | 7/2000 | Kelleher et al. | |
| 6,094,065 A | 7/2000 | Tavana et al. | |
| 6,119,181 A | 9/2000 | Vorbach et al. | |
| 6,120,551 A | 9/2000 | Law et al. | |
| 6,122,670 A | 9/2000 | Bennett et al. | |
| 6,150,838 A | 11/2000 | Wittig et al. | |
| 6,195,788 B1 | 2/2001 | Leaver et al. | |
| 6,230,307 B1 | 5/2001 | Davis et al. | |
| 6,237,029 B1 | 5/2001 | Master et al. | |
| 6,266,760 B1 | 7/2001 | DeHon et al. | |
| 6,282,627 B1 | 8/2001 | Wong et al. | |
| 6,282,651 B1 | 8/2001 | Ashe | |
| 6,311,149 B1 | 10/2001 | Ryan et al. | |
| 6,338,106 B1 | 1/2002 | Vorbach et al. | |
| 6,353,841 B1 | 3/2002 | Marshall et al. | |
| 6,405,299 B1 | 6/2002 | Vorbach et al. | |
| 6,408,039 B1 | 6/2002 | Ito | |
| 6,410,941 B1 | 6/2002 | Taylor et al. | |
| 6,425,068 B1 | 7/2002 | Vorbach et al. | |
| 6,433,578 B1 | 8/2002 | Wasson | |
| 6,480,937 B1 | 11/2002 | Vorbach et al. | |
| 6,542,998 B1 | 4/2003 | Vorbach et al. | |
| 6,571,381 B1 | 5/2003 | Vorbach et al. | |
| 6,640,304 B2 | 10/2003 | Ginter et al. | |
| 6,697,948 B1 * | 2/2004 | Rabin et al. | 726/30 |
| 6,697,979 B1 | 2/2004 | Vorbach et al. | |
| 6,718,319 B1 | 4/2004 | Fisher, Jr. et al. | |
| 6,732,105 B1 * | 5/2004 | Watson et al. | 707/10 |
| 6,751,729 B1 * | 6/2004 | Giniger et al. | 713/153 |
| 6,757,831 B1 | 6/2004 | Folmsbee | |
| 6,766,353 B1 * | 7/2004 | Lin et al. | 709/203 |
| 6,847,948 B1 * | 1/2005 | Paolini et al. | 705/56 |
| 6,889,212 B1 * | 5/2005 | Wang et al. | 705/59 |
| 7,003,660 B2 | 2/2006 | Vorbach et al. | |
| 7,210,129 B2 | 4/2007 | May et al. | |
| 7,266,725 B2 | 9/2007 | Vorbach et al. | |
| 7,337,317 B2 * | 2/2008 | Meggitt et al. | 713/164 |
| 7,394,284 B2 | 7/2008 | Vorbach | |
| 7,434,191 B2 | 10/2008 | Vorbach et al. | |
| 7,444,531 B2 | 10/2008 | Vorbach et al. | |
| 2005/0210273 A1 * | 9/2005 | Gersten et al. | 713/189 |
| 2006/0156010 A1 * | 7/2006 | Kim | 713/176 |
| 2007/0061584 A1 * | 3/2007 | Takashima et al. | 713/176 |

OTHER PUBLICATIONS

Souza, Crista. "Quicksilver Buys DSP Design House White Eagle." Electronic Buyers News, Jul. 17, 2000, Issue 1220.

Dipert, Brian. "Figuring Out Reconfigurable Logic," EDN, Aug. 5, 1999, vol. 44, Issue 16.

Souza, Crista. "Reconfigurability Puts New Face on Computing," Electronic Buyers' News, Apr. 3, 2000, Issue 1205.

Office Action. U.S. Appl. No. 10/286,633 dtd. Jul. 27, 2009.

* cited by examiner

CONSUMER PRODUCT DISTRIBUTION IN THE EMBEDDED SYSTEM MARKET

CROSS-REFERENCE TO RELATED APPLICATION

This is a continuation-in-part of application Ser. No. 10/010,018 filed on Dec. 5, 2001 now abandoned, and is claiming the benefit of that application under 35 USC §120. The present application is related to application Ser. No. 10/199,900, entitled "Consumer Product Distribution In The Embedded System Market With Structure To Increase Revenue Potential", filed Jul. 18, 2002.

FIELD OF THE INVENTION

The present invention relates to distribution of consumer products in the embedded systems market.

BACKGROUND OF THE INVENTION

The electronics industry has become increasingly driven to meet the demands of high-volume consumer applications, which comprise a majority of the embedded systems market. Embedded systems face challenges in producing performance with minimal delay, minimal power consumption, and at minimal cost. As the numbers and types of consumer applications where embedded systems are employed increases, these challenges become even more pressing. Examples of consumer applications where embedded systems are employed include handheld devices, such as cell phones, personal digital assistants (PDAs), global positioning system (GPS) receivers, digital cameras, etc. By their nature, these devices are required to be small, low-power, light-weight, and feature-rich.

As consumer products, these devices also must remain easily attainable and cost competitive. Associated with making devices readily attainable is a need for an efficient, secure, and convenient distribution scheme that maintains protection of proprietary rights for the product manufacturers through proper licensing control without sacrificing financial gain. The present invention addresses such needs.

SUMMARY OF THE INVENTION

Aspects for consumer product distribution in the embedded system market are described. The aspects include forming a secure network for distributing product digitation files capable of configuring operations of an adaptive computing engine (ACE), and providing an agent server within the secure network for controlling licenses of the product digitation files, wherein a separation of responsibility and control of the distributing and licensing exists.

Through the present invention, a distribution process is achieved that provides a safe, reliable, and efficient approach to ensuring successful and convenient consumer product access. Further, the nature of the distribution allows for multiple opportunities for continued revenue generation. These and other advantages will become readily apparent from the following detailed description and accompanying drawings.

DETAILED DESCRIPTION OF THE INVENTION

The present invention relates to distribution of consumer products in the embedded system market. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is described for particular applicability to an environment in which an electronic product is provided as two separate consumer items, an adaptive silicon foundation and a digitation file. The adaptive silicon foundation allows for a blank slate onto which a desired hardware designation and software application are applied via the digitation file. Thus, the distinction between software and hardware becomes negligible, as the adaptive silicon remains seemingly useless until the application of the digitation file to the adaptive silicon commences. The present invention relates to the aspects of distribution of the digitation file in a manner that allows for the separation of the responsibility of distribution and licensing and of authentication and encryption, while ensuring product security and integrity with proper revenue generation and notification when providing a consumer product.

Figure 1A:
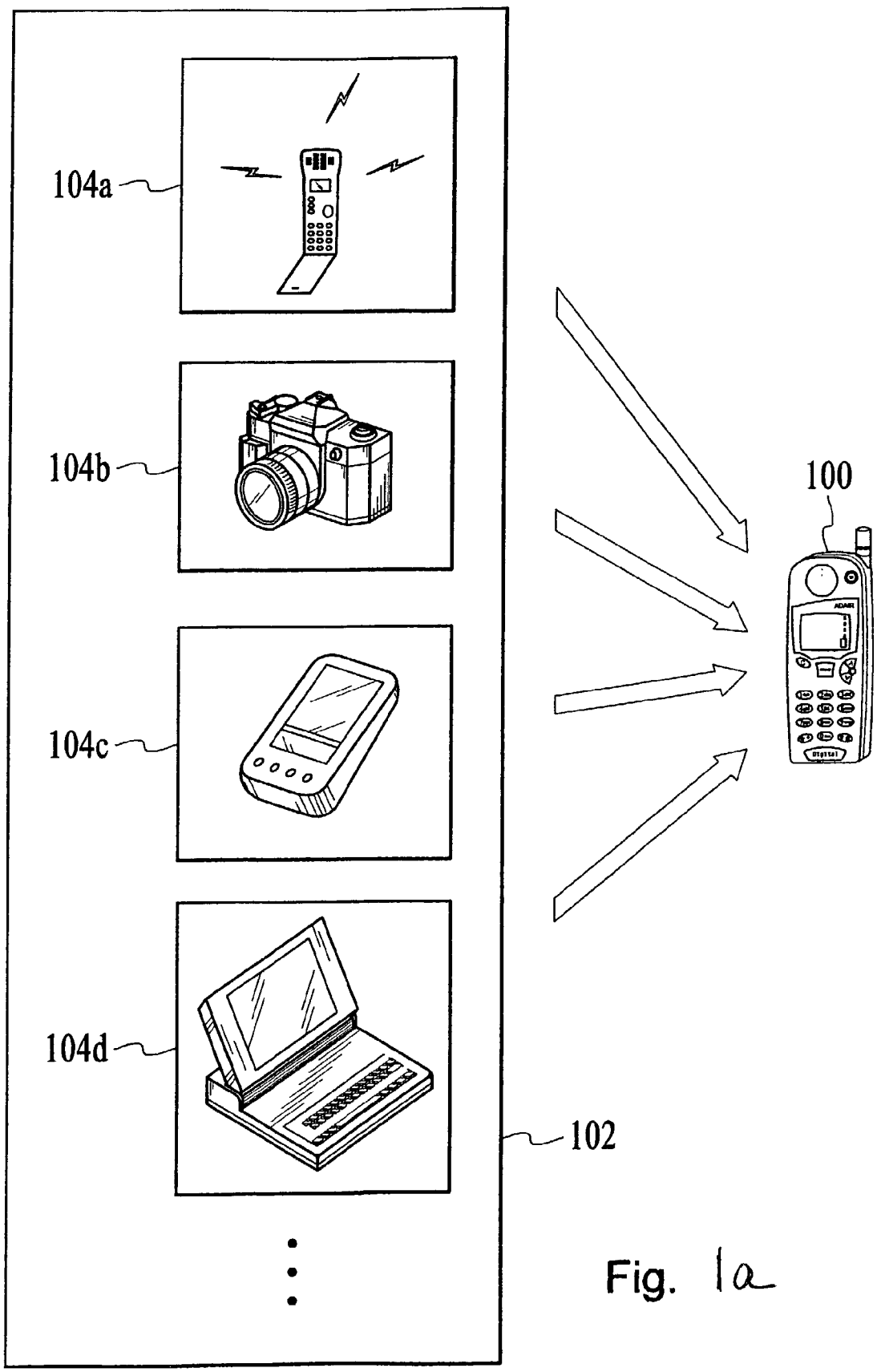
FIGS. 1a and 1b illustrate a preferred embodiment of providing a consumer product in accordance with the present invention.
Figure 1B:
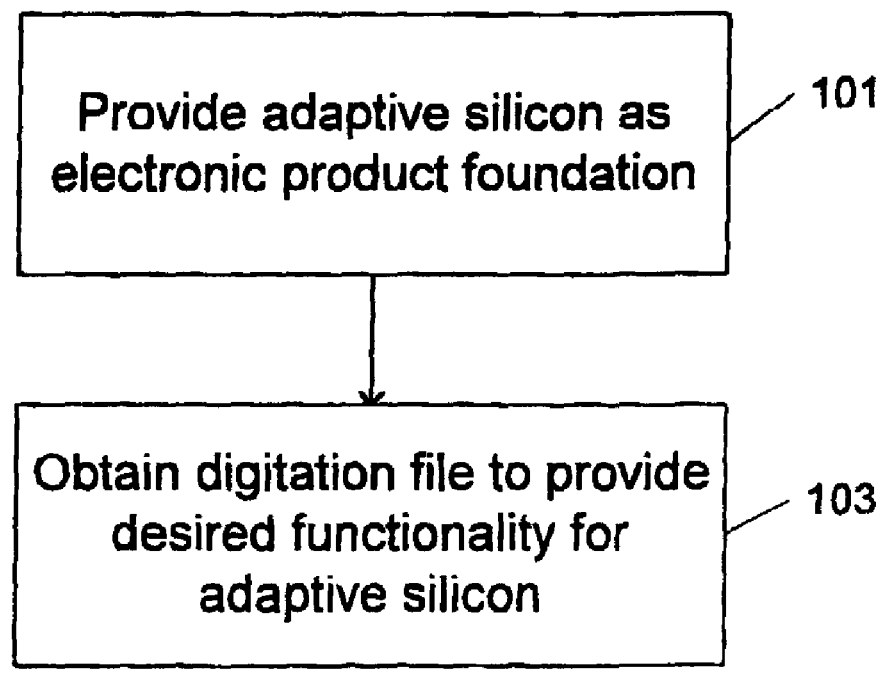

FIGS. 1a and 1b illustrate providing a consumer product in accordance with the present invention. Referring concurrently to FIGS. 1a and 1b, in a preferred embodiment, the adaptive silicon is presented as a consumer product 100 in the form of a handheld device (step 101). In order to provide the desired functionality into the product 100, a desired digitation file is obtained (step 103). As represented by FIG. 1a, in an exemplary embodiment, the desired digitation file may include one of a plurality of digitation files, each of which is accessible from a computer readable medium 102, such as files on a computer server, e.g., a digitation file 104a to configure the product as a cellular phone; a digitation file 104b to configure the product as a PDA (personal digital assistant); a digitation file 104c to configure the product as a calculator; and a digitation file 104d to configure the product as a digital camera. Of course, the types of consumer products and digitation files described are meant to be illustrative and not restrictive of the types, so that further future developments for handheld electronic devices are also expected to be able to be applicable to the aspects of the present invention. Further, the procurement of the desired digitation file occurs by any suitable method that allows a consumer to download or otherwise apply the digitation file onto the adaptive silicon. Additionally, the download may include updates to a particular configuration rather than a change to a new configuration.

By the nature of the digitation file providing the hardware designation and software application for the adaptive silicon, the value of the actual silicon performing the operations of the product is relative to the value of the digitation file. This represents a shift from the typical paradigm of consumer products, where the silicon hardware often is designed to perform the particular function of the device, as in an ASIC approach, and thus, the silicon hardware bears the value and the costs associated with the device. In contrast, with the present invention, the cost of the silicon becomes of much less significance, while the digitation file bears more of the value and the costs associated with the device.

In a preferred embodiment, the adaptive silicon is provided as an adaptive computing engine (ACE). A more detailed discussion of the aspects of an ACE are provided in co-pending U.S. patent application Ser. No. 09/815,122 entitled "Adaptive Integrated Circuitry with Heterogeneous and Reconfigurable Matrices of Diverse and Adaptive Computational Units Having Fixed, Application Specific Computational Elements," filed Mar. 22, 2001, and assigned to the assignee of the present invention. Portions of that discussion are presented in the following in order to more full illustrate the aspects of the present invention.

Figure 2:
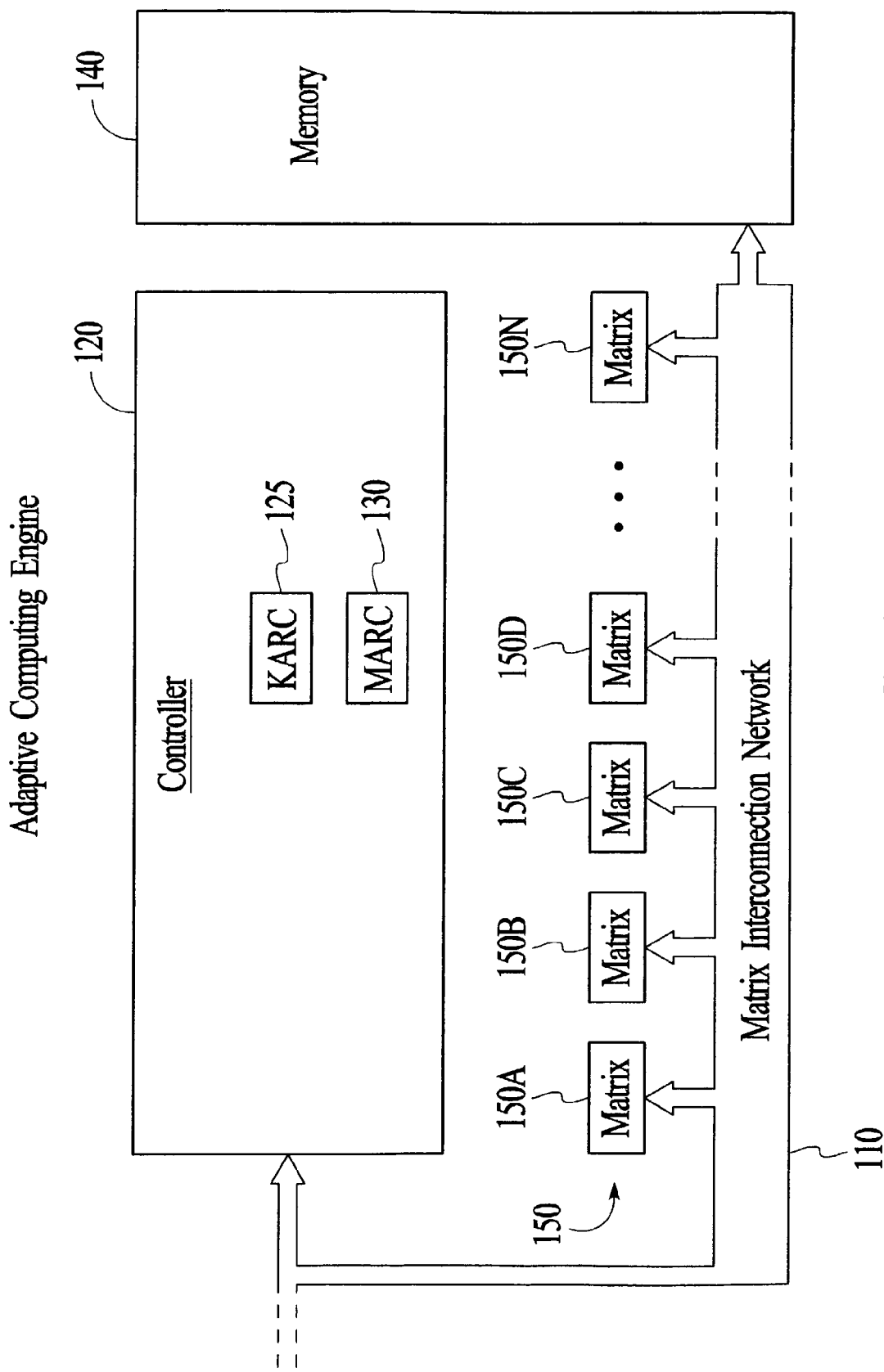
FIG. 2 is a block diagram illustrating an adaptive computing engine.

FIG. 2 is a block diagram illustrating an adaptive computing engine ("ACE") 106 that includes a controller 120, one or more reconfigurable matrices 150, such as matrices 150A through 150N as illustrated, a matrix interconnection network 110, and preferably also includes a memory 140.

Figure 3:
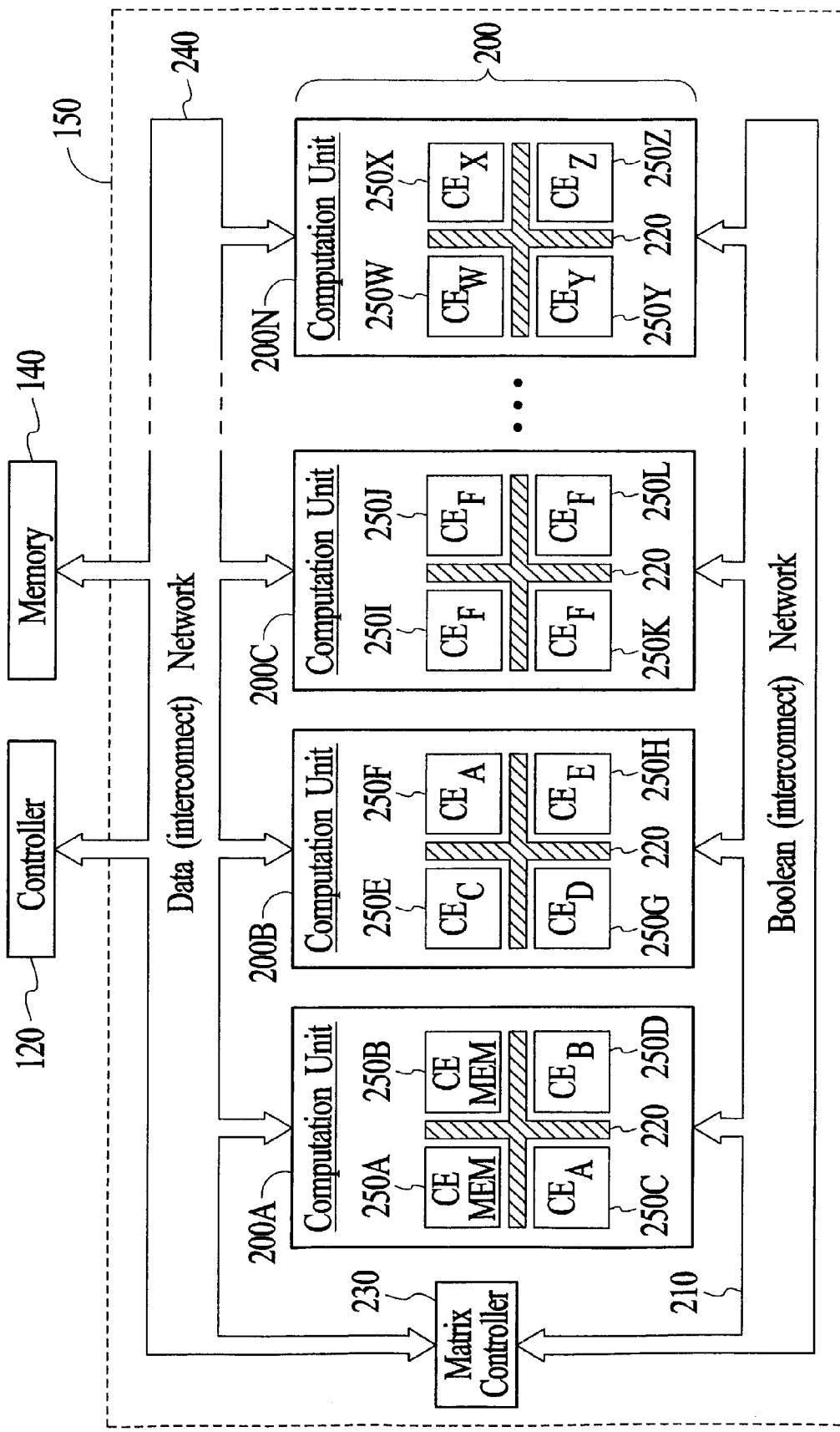
FIG. 3 is a block diagram illustrating, in greater detail, a reconfigurable matrix of the adaptive computing engine.

FIG. 3 is a block diagram illustrating, in greater detail, a reconfigurable matrix 150 with a plurality of computation units 200 (illustrated as computation units 200A through 200N), and a plurality of computational elements 250 (illustrated as computational elements 250A through 250Z), and provides additional illustration of the preferred types of computational elements 250 and a useful summary of aspects of the present invention. As illustrated in FIG. 3, any matrix 150 generally includes a matrix controller 230, a plurality of computation (or computational) units 200, and as logical or conceptual subsets or portions of the matrix interconnection network 110, a data interconnect network 240 and a Boolean interconnect network 210. The Boolean interconnect network 210, as mentioned above, provides the reconfigurable interconnection capability between and among the various computation units 200, while the data interconnect network 240 provides the reconfigurable interconnection capability for data input and output between and among the various computation units 200. It should be noted, however, that while conceptually divided into reconfiguration and data capabilities, any given physical portion of the matrix interconnection network 110, at any given time, may be operating as either the Boolean interconnect network 210, the data interconnect network 240, the lowest level interconnect 220 (between and among the various computational elements 250), or other input, output, or connection functionality.

Continuing to refer to FIG. 3, included within a computation unit 200 are a plurality of computational elements 250, illustrated as computational elements 250A through 250Z (collectively referred to as computational elements 250), and additional interconnect 220. The interconnect 220 provides the reconfigurable interconnection capability and input/output paths between and among the various computational elements 250. As indicated above, each of the various computational elements 250 consist of dedicated, application specific hardware designed to perform a given task or range of tasks, resulting in a plurality of different, fixed computational elements 250. Utilizing the interconnect 220, the fixed computational elements 250 may be reconfigurably connected together to execute an algorithm or other function, at any given time.

In a preferred embodiment, the various computational elements 250 are designed and grouped together, into the various reconfigurable computation units 200. In addition to computational elements 250 which are designed to execute a particular algorithm or function, such as multiplication, other types of computational elements 250 are also utilized in the preferred embodiment. As illustrated in FIG. 3, computational elements 250A and 250B implement memory, to provide local memory elements for any given calculation or processing function (compared to the more "remote" memory 140). In addition, computational elements 250I, 250J, 250K and 250L are configured (using, for example, a plurality of flip-flops) to implement finite state machines, to provide local processing capability, especially suitable for complicated control processing.

With the various types of different computational elements 250, which may be available, depending upon the desired functionality of the ACE 106, the computation units 200 may be loosely categorized. A first category of computation units 200 includes computational elements 250 performing linear operations, such as multiplication, addition, finite impulse response filtering, and so on. A second category of computation units 200 includes computational elements 250 performing non-linear operations, such as discrete cosine transformation, trigonometric calculations, and complex multiplications. A third type of computation unit 200 implements a finite state machine, such as computation unit 200C as illustrated in FIG. 3, particularly useful for complicated control sequences, dynamic scheduling, and input/output management, while a fourth type may implement memory and memory management, such as computation unit 200A as illustrated in FIG. 3. Lastly, a fifth type of computation unit 200 may be included to perform digitation-level manipulation, such as for encryption, decryption, channel coding, Viterbi decoding, and packet and protocol processing (such as Internet Protocol processing).

Figure 4:
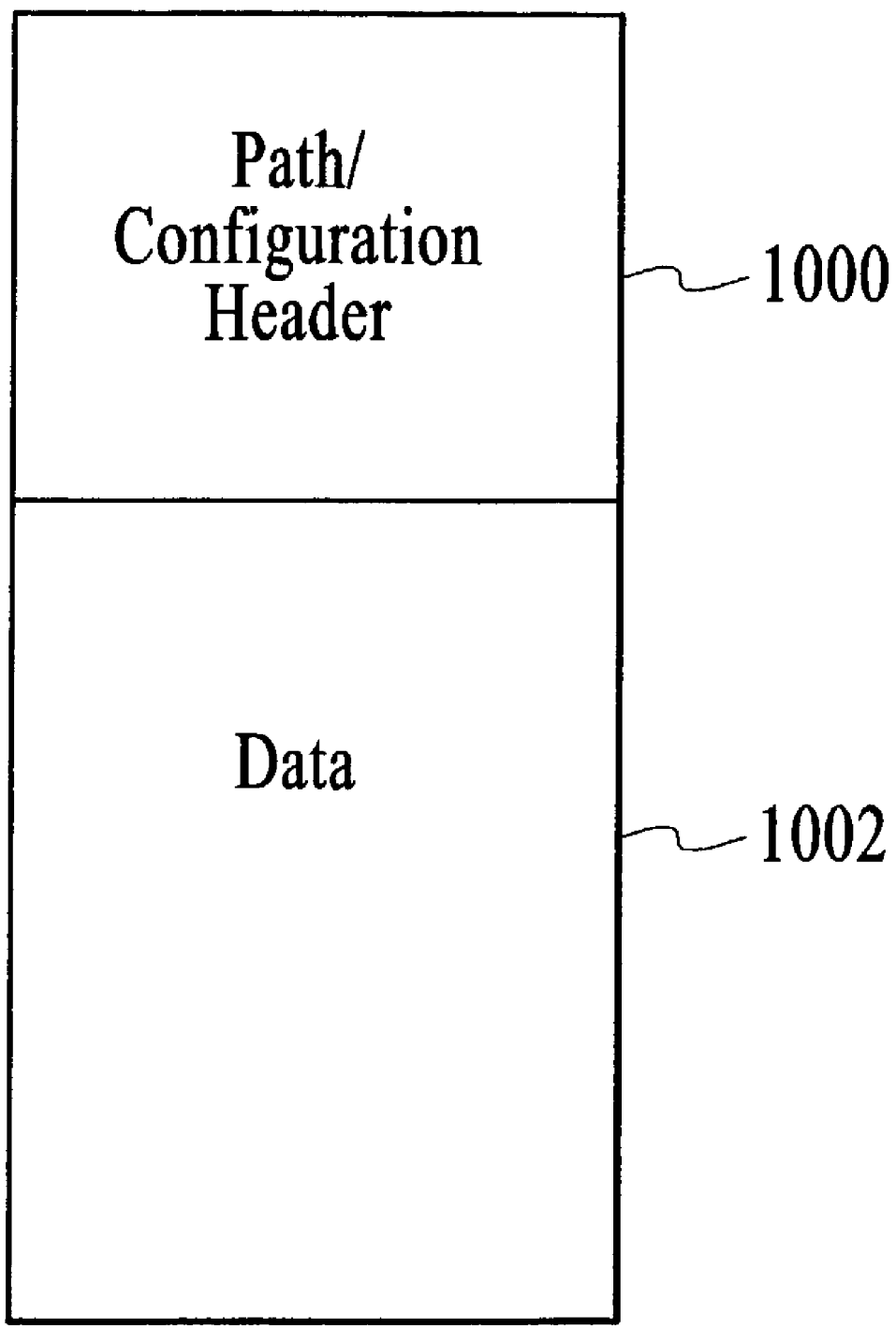
FIG. 4 illustrates a diagram of a digitation file in accordance with the present invention.

Next, a digitation file represents a tight coupling (or inter-digitation) of data and configuration (or other control) information, within one, effectively continuous stream of information. As illustrated in the diagram of FIG. 4, the continuous stream of data can be characterized as including a first portion 1000 that provides adaptive instructions and configuration data and a second portion 1002 that provides data to be processed. This coupling or commingling of data and configuration information is referred to as a "silverware" module and helps to enable real-time reconfigurability of the ACE 106. For example, as an analogy, a particular configuration of computational elements, as the hardware to execute a corresponding algorithm, may be viewed or conceptualized as a hardware analog of "calling" a subroutine in software that may perform the same algorithm. As a consequence, once the configuration of the computational elements has occurred, as directed by the configuration information, the data for use in the algorithm is immediately available as part of the silverware module. The immediacy of the data, for use in the configured computational elements, provides a one or two clock cycle hardware analog to the multiple and separate software steps of determining a memory address and fetching stored data from the addressed registers. This has the further result of additional efficiency, as the configured computational elements may execute, in comparatively few clock cycles, an algorithm which may require orders of magnitude more clock cycles for execution if called as a subroutine in a conventional microprocessor or DSP.

This use of silverware modules, as a commingling of data and configuration information, in conjunction with the real-time reconfigurability of heterogeneous and fixed computational elements 250 to form different and heterogeneous computation units 200 and matrices 150, enables the ACE 100 architecture to have multiple and different modes of operation. For example, when included within a hand-held device, given a corresponding silverware module, the ACE 100 may have various and different operating modes as a cellular or other mobile telephone, a music player, a pager, a personal digital assistant, and other new or existing functionalities. In addition, these operating modes may change based upon the physical location of the device; for example, when configured as a CDMA mobile telephone for use in the United States, the ACE 100 may be reconfigured as a GSM mobile telephone for use in Europe.

In accordance with the present invention, a network is achieved that allows for the distribution of the silverware in a manner that ensures security and integrity of the data transfer. Through the security provided, only the licensed and authorized classes of applications are loaded and executed on the ACE with validation that only the anticipated suppliers and consumers are exchanging applications and revenues/sales are collected as appropriate for each download. Further, the monitoring for proper security allows for notifications of abuse. In an preferred embodiment, security and permissions are validated for application downloads of one-time connected, one-way connected and bi-directionally connected devices independent of the frequency, medium (e.g. wired or wireless) and network connectivity to the Internet.

Figure 5:
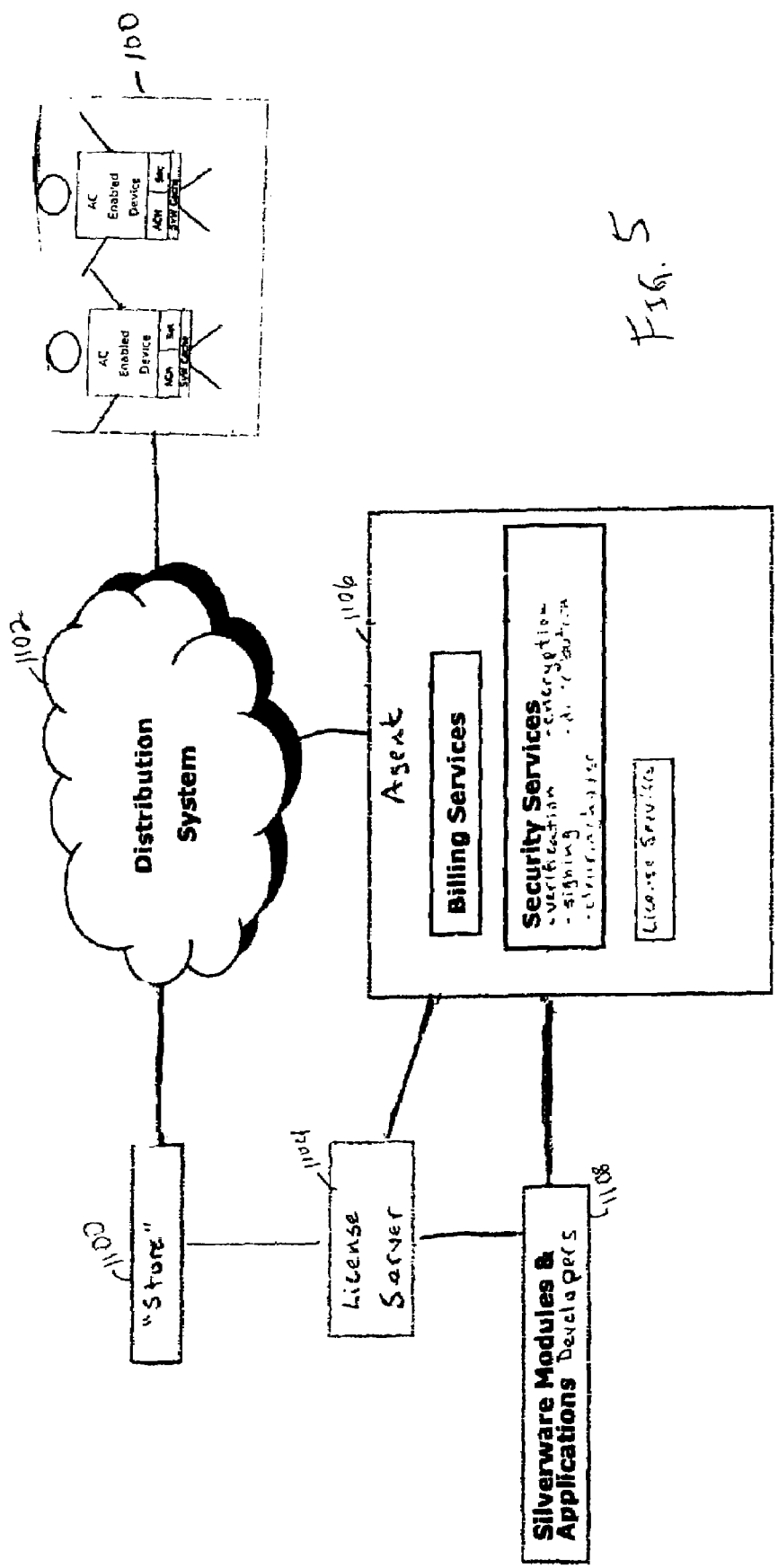
FIG. 5 illustrates a block diagram of a distribution network in accordance with the present invention.

Referring to FIG. 5, a block diagram illustrates system components of the distribution network 1100 in accordance with the present invention. As shown, the network includes consumer product(s) 100 being utilized by end-user(s) to which silverware made be distributed from a "store" 1100 for updates/changes/enhancements to the product(s) 100. Silverware can be downloaded on demand over a wide variety of distribution system 1102 options (web, wireless, memory stick, etc.) to add functionality and/or features to the product(s), as is well appreciated by those skilled in the art. Further included in the network is a license server 1104 that acts in conjunction with an agent server 1106 to enforce and ensure security of distribution with proper tracking and notification of revenue generation events on behalf of silverware developers 1108 during distribution, as described in more detail hereinbelow.

Figure 6:
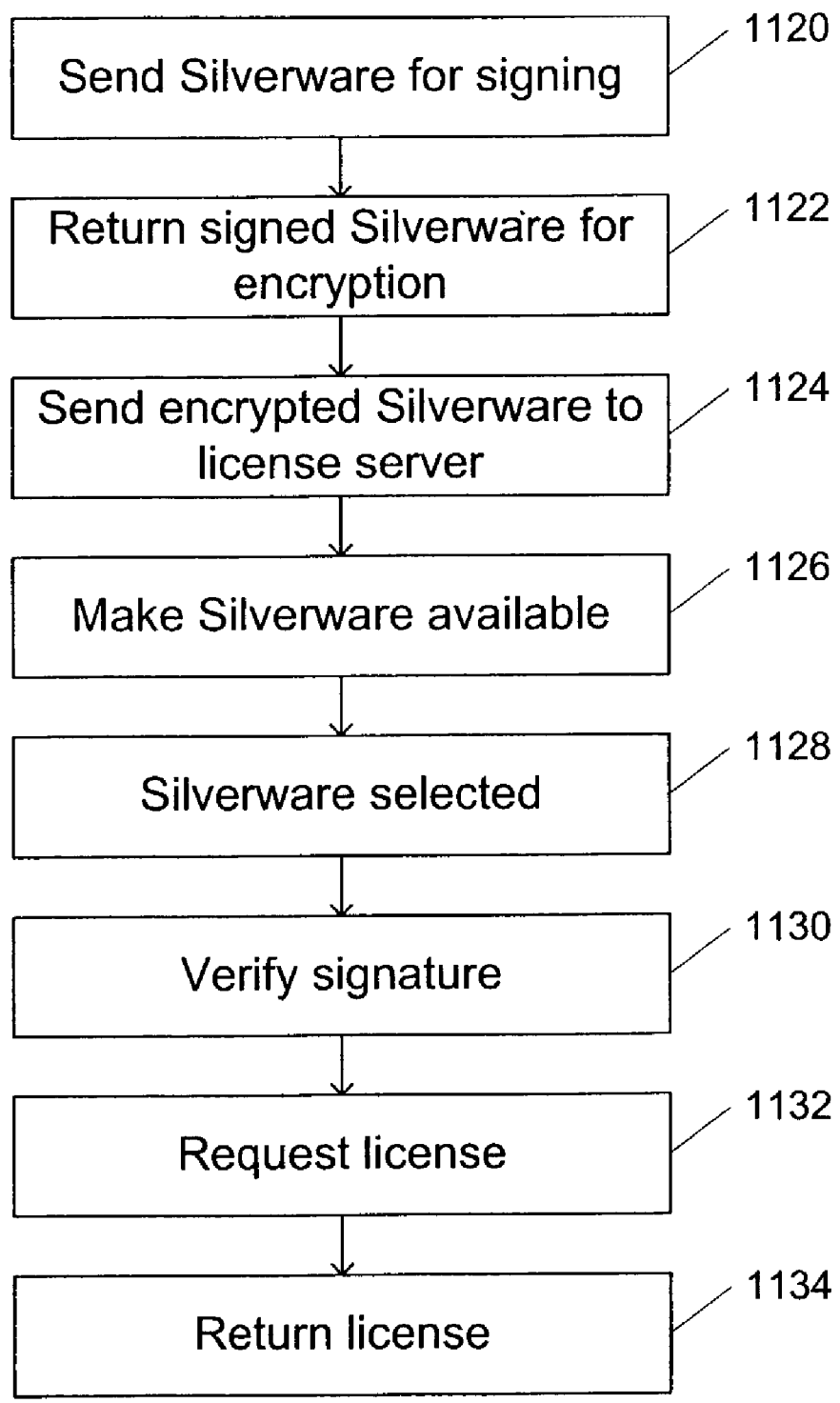
FIG. 6 illustrates a flow diagram of a distribution method for the network of FIG. 5 in accordance with the present invention.

Referring now to FIG. 6, a block flow diagram illustrates steps involved in an expected flow of silverware from the developer 1108 of the silverware to the end user. When silverware is produced it is sent via a secure channel to the agent server 1106 who verifies the silverware and signs it (step 1120). Once signed, an ACE-based device 100 can verify the signature using certificates, and with the cryptographic signature, the silverware cannot be modified without being detected. The signed silverware then goes back to its developer 1108 who creates a code ID (CID identifies the function and version of a module) and can choose to encrypt it with a key to protect any proprietary information (step 1122). The CID, the key, and the license terms are then sent via secure channel to the license server 1104 (step 1124), which stores the data in a database, where the silverware can then be made available from the store 1100 (step 1126).

At some point, silverware is selected for loading onto the device (step 1128). When the silverware actually loads on the device 100, a security manager of the device 100 verifies the signature against the certificate issued by the agent server 1106 (step 1130). The device 100 further connects to the license server 1104 through a secure protocol to request a license (step 1132), sending the ID of the silverware and its own ID. The license server 1104 then returns a license (step 1134), which indicates under what conditions the silverware can run.

For purposes of this disclosure, the agent server 1106 utilizes secure server tools to perform a number of services during the distribution process, including verification services, signing services, encryption services, distribution services, and clearinghouse services. The verification services are provided to verify the silverware modules by running a series of tests that ensure that the silverware module meets a limited set of tests to help ensure the safe and reliable operation of silverware on the devices. The signing services are used for the signing of silverware modules. Preferably, the signing services generate a unique ID and signs a silverware module to protect it from tampering. The verified, signed silverware module is then passed back to the developer for encryption to protect other proprietary information if required. Once signed, any changes, tampering, or attacks to the module can be quickly detected. Modules which are not signed, or are signed incorrectly to indicate tampering will not load. The encryption services are used for the encryption of silverware modules. Encryption of silverware modules ensures the protection of proprietary information both in the silverware, as well as protecting the methods and architecture of the ACE itself. Further, as their names indicate, the distribution service is used for the distribution of silverware modules and applications and the clearinghouse service is used to manage clearinghouse functions.

Separate tools are provided to perform the billing service and to perform the license service. The license service tool is designed to issue and authorize licenses to silverware modules to allow them to run on one or more devices. The billing system service handles revenue notification. This tool receives revenue events from ACE-enabled devices and other notification systems and generates appropriate revenue event notification.

There are a number of revenue events during distribution in accordance with an aspect of the present invention. By the nature of the silverware providing the hardware designation and software application for the adaptive silicon, the assurance of the integrity of the silverware being obtained is paramount. Accordingly, as described above, there are several points during distribution in which security checking occurs to provide the assurance. Thus, there are multiple opportunities of potential revenue generation that exist during distribution and extend beyond the initial licensing fees charged to venture companies to use the ACE in a specific market. With reference to step 1120 of FIG. 6, the verification and signing of the silverware is a control point, since silverware that is not signed will not load. Further, each time the silverware is changed, it needs to be verified and signed. Thus, the cost involved in the provision of the verification of the silverware provides a point during distribution where a revenue event occurs.

The provision of a license server 1104 offers another revenue generation opportunity during distribution. As described above, the license server 1104 acts an integral part of the distribution process. Further, a license server 1104 needs to be provided by each silverware developer 1108. By offering the license server service either directly to each developer, or by offering the software, and possible consulting services, for the establishment of the license server, an additional avenue for revenue generation is created.

For non-web environments, a download server presents an option for performing downloads to an application on a host computer system, which then communicates to the ACE. While there is no security required here, the need for the mechanism is another point that exists for distribution revenue generation.

An additional revenue opportunity can be generated from issuing certificates. For the distribution process, each license server 1104 needs a certificate, as does the signing authority and each ACE. Thus, a fee can be generated for each certificate, or alternatively, for issuing a certain number of certificates to each developer 1108. Further, there is a cost to running a certificate authority, since it has to be housed in a secure facility and run securely, which can be recovered directly by inclusion in the fee generation.

In this manner, multiple opportunities for continued revenue generation are achieved through the aspects of distribution in accordance with the present invention. Further, the aspects of the distribution process itself provide a safe, reliable, and efficient approach to ensuring successful and convenient consumer product access.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

What is claimed is:

1. A system for consumer product distribution, the system comprising:
   an agent server configured to:
      receive a digitation file from a source, wherein the digitation file comprises an interdigitated stream of data that includes configuration information and data to be processed by an adaptive computing engine (ACE), and wherein operations performed by the ACE are configured by the digitation file,
      associate the digitation file with a certificate to create a signed digitation file, and
      return the signed digitation file to the source; and
   a license server configured to:
      store the signed digitation file, and
      store a license associated with the signed digitation file,
   wherein a first ACE is configured to receive a first instance of the digitation file, verify that the first instance of the digitation file includes a signature that corresponds to the certificate associated with the digitation file by the agent server, and request a first instance of the license associated with the first instance of the digitation file from the license server.

2. The system of claim 1, further comprising a secure connection for transmitting the digitation file from the source to the agent server.

3. The system of claim 2, wherein the agent server returns the signed digitation file to the source across the secure connection.

4. The system of claim 3, wherein the source is configured to encrypt the signed digitation file and to assign a code identifier to the signed and encrypted digitation file.

5. The system of claim 4, wherein the source is further configured to send the signed and encrypted digitation file to the agent server to be made available for acquisition.

6. The system of claim 1, wherein the first ACE includes a security manager configured to verify that the first instance of the digitation file includes a signature that corresponds to the certificate associated with the digitation file by the agent server.

7. The system of claim 6, wherein the security manager is configured to save the first instance of the license received from the license server and to determine terms of the first instance of the license for tracking use of the first instance of the digitation file.

8. The system of claim 1, wherein the first ACE and the license server utilize certificates to authenticate with each other.

9. The system of claim 1, wherein the first ACE includes:
   a memory storing the first instance of the digitation file, wherein the memory includes an adaptive silicon foundation, and wherein the first instance of the digitation file, when applied to the adaptive silicon foundation, provides a hardware designation and software application for the adaptive silicon foundation;
   a plurality of computational elements; and
   an interconnection network adapted to configure the plurality of computational elements in response to the configuration information to perform any one of a plurality of algorithms in response to the configuration information.

10. A method for consumer product distribution, the method comprising the steps of:
   receiving a digitation file from a source, wherein the digitation file comprises an interdigitated stream of data that includes configuration information and data to be processed by an adaptive computing engine (ACE), and wherein operations performed by the ACE are configured by the digitation file;
   associating the digitation file with a certificate to create a signed digitation file; and
   returning the signed digitation file to the source,
   wherein the signed digitation file and a license associated with the signed digitation file are stored in a license server, and
   wherein a first ACE is configured to receive a first instance of the digitation file, verify that the first instance of the digitation file includes a signature that corresponds to the certificate associated with the digitation file by the agent server, and request a first instance of the license associated with the first instance of the digitation file from the license server.

11. The method of claim 10, further comprising the step of: utilizing a secure connection for receiving the digitation file from the source.

12. The method of claim 11, wherein the step of returning the signed digitation file to the source is performed over the secure connection.

13. The method of claim 10, wherein the source is configured to encrypt the signed digitation file and to assign a code identifier to the encrypted and encrypted digitation file.

14. The method of claim 10, wherein the first ACE is further configured to request acquisition of the first instance of the digitation file.

15. The method of claim 10, wherein the first ACE includes a security manager configured to verify that the signature included in the first instance of the digitation file corresponds to the certificate associated with the digitation file by an agent server.

16. The method of claim 10, wherein the first ACE includes:
   a memory storing the first instance of the digitation file, wherein the memory includes an adaptive silicon foundation, and wherein the first instance of the digitation file, when applied to the adaptive silicon foundation, provides a hardware designation and software application for the adaptive silicon foundation;

a plurality of computational elements; and an interconnection network adapted to configure the plurality of computational elements in response to the configuration information to perform any one of a plurality of algorithms in response to the configuration information.

* * * * *